United States Patent [19]

Schatz

[11] 4,066,873
[45] Jan. 3, 1978

[54] IDENTIFICATION AND ACCESS CARD WITH ASSOCIATED OPTICAL DECODING MEANS

[75] Inventor: Vernon L. Schatz, Northfield, Ill.

[73] Assignee: The First National Bank of Chicago, Chicago, Ill.

[21] Appl. No.: 652,089

[22] Filed: Jan. 26, 1976

[51] Int. Cl.² .......................... G06K 7/14; G09F 3/02
[52] U.S. Cl. ........................................ 235/487; 40/2.2
[58] Field of Search ................ 235/61.12 N, 61.11 D, 235/61.11 E, 61.7 B; 360/2, 131; 40/2.2; 341/149 A

[56] References Cited

U.S. PATENT DOCUMENTS

| 3,665,513 | 5/1972 | Benson | 235/61.12 M |
| 3,775,594 | 11/1973 | Pasieka | 235/61.12 N |
| 3,836,754 | 9/1974 | Toye | 235/61.12 N |
| 3,863,050 | 1/1975 | Brugger | 235/61.7 B |
| 3,959,630 | 5/1976 | Hogberg | 235/61.12 N |

OTHER PUBLICATIONS

R. L. Gilbert, — "Label Printer", IBM Technical Disclosure Bulletin, vol. 17, No. 5, pp. 1320-1321, Oct. 1974.

Primary Examiner—Robert M. Kilgore
Attorney, Agent, or Firm—Fitch, Even, Tabin & Luedeka

[57] ABSTRACT

An identification card system is disclosed which comprises a plastic card blank of a size and thickness that is commercially used for credit card purposes and which may have the identity of the person, company or the like to whom it is issued embossed thereon as well as art work and information identifying the issuing organization. Moreover, the identification card may have a magnetic stripe for providing magnetically encoded information thereon if desired. The identification card embodying the present invention includes one or more members applied during or subsequently of the fabrication of the card blank, which members have an omnidirectionally rectilinear bar binary coded information label applied to either the front or backside of the card. A transparent coating is provided to smooth the transition from the card surface to the surface of the label.

14 Claims, 3 Drawing Figures

IDENTIFICATION AND ACCESS CARD WITH ASSOCIATED OPTICAL DECODING MEANS

This invention generally relates to the construction of general purpose access and identification cards and, more particularly, an identification card having coded information means applied thereto.

The proliferation of credit cards in our society has resulted in continued search and development in connection with new systems and approaches that avail credit cards to new uses. While large retail stores, oil companies and the like have issued their own credit cards for some time and the smaller retail stores have contracted with nation-wide credit associations, the more recent developments on the retail scene have included the use of general purpose access cards by banking establishments and saving and loan associations, i.e. the card provides access to the customer file at the banking institution so that information concerning the status of the file can be obtained and it can be updated at the time the card is used. The whole concept of electronic funds transfer systems, referred to as EFTS, is believed by many to be the direction of the financial and banking industry in the future. Accordingly, access cards for use in banking transactions will undoubtedy become more prevalent in the future.

Presently, credit and identification cards are adapted for use in many different types of systems and are provided with embossed letters which may be read by machines that are adapted to do so, or they may contain magnetic stripes which have information coded thereon which can be read by a magnetic code reader. The most basic, of course, is the usual printing that is applied to the cards which may be humanly read. While banking institutions as well as saving and loan associations are increasing the type of transactions that can be accomplished using access cards and automatic card reading apparatus, other industries are also becoming more sophisticated and, among them, is the grocery industry which has adopted the Universal Product Code (UPC) labels for use with the identification of grocery products. The UPC labels identifying the manufacturer and the product (including its size and/or weight) now appear on a majority of the products that are normally found within the supermarkets. This enables an automatic checkout system to be used to scan the label and provide high speed checkout capability together with a more comprehensive printout on the receipt of the products that were purchased. In addition to speeding the checkout process, which benefits the customer, the grocery store is benefited because fewer numbers of checkout personnel are needed to accommodate the same if not larger volume of customers.

Recently, there has been collaboration between some grocery concerns and banking institutions, in that the large supermarket companies are utilizing identification cards from banking institutions for check cashing privileges in the supermarket. In the event the supermarket is provided with an automatic optical scanning apparatus that reads the UPC labeled products, the scanning apparatus is already present at the checkout counter.

Accordingly, it is an object of the present invention to provide a banking or other financial institution identification and access card that is adapted for use with scanning apparatus of the type which reads the Universal Product Code labels that appear on products in the grocery industry.

Another object of the present invention is to provide a credit card having UPC information identifying the banking institution as well as the identity of the card holder in a manner whereby the flexibility of the card is maintained and the cost of issuing the card is not economically prohibitive.

Other objects and advantages will become apparent upon reading the following detailed description, while referring to the attached drawings, in which.

Figure 1:
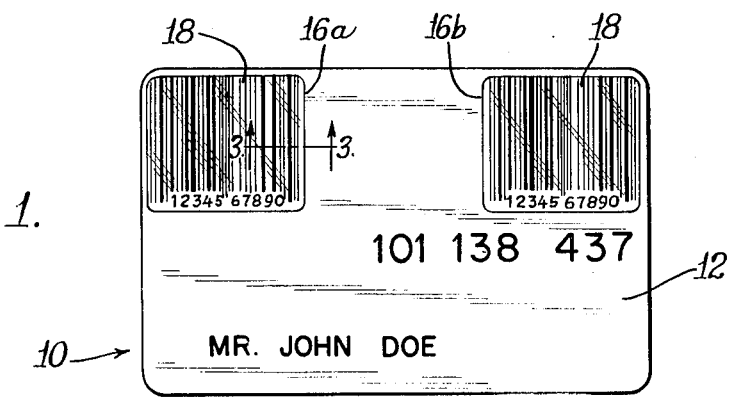
FIG. 1 is a plan view of the front side of a credit card embodying the present invention.

Turning now to the drawings, and particularly FIG. 1, a credit card embodying the present invention is shown generally at 10 and includes a plastic blank 12 which may be fabricated from standard credit card stock which is preferably comprised of a polyvinyl chloride base material to which printing or other decorative art work associated with the issuing bank or concern or the like is printed and over which a thin layer of polyvinyl chloride may be applied to protectively seal the art work therewithin. It should be appreciated that the manufacture of such cards can be done without regard to providing information that is unique to an individual card that would be subsequently issued to a card holder, thus permitting high speed manufacturing techniques to be used during fabrication. In this regard, a bank or other concern typically orders many thousand card blanks at a time and thereafter stores them for subsequent issuance, the embossing and other unique information that may be incorporated into the card being done at a later time. Thus, the embossing of the card holder's name, shown to be "Mr. John Doe" in FIG. 1, as well as a unique identification number which may be similar to that shown by the number "101 138 437" in FIG. 1 may be added when the card is issued to an individual. In the event that a magnetic stripe is provided with data in accordance with the data format of the American Banking Association stripe, for example, a magnetic stripe 14 may be provided on the backside of the card as shown in FIG. 2 and encoded with the necessary information.

Figure 2:
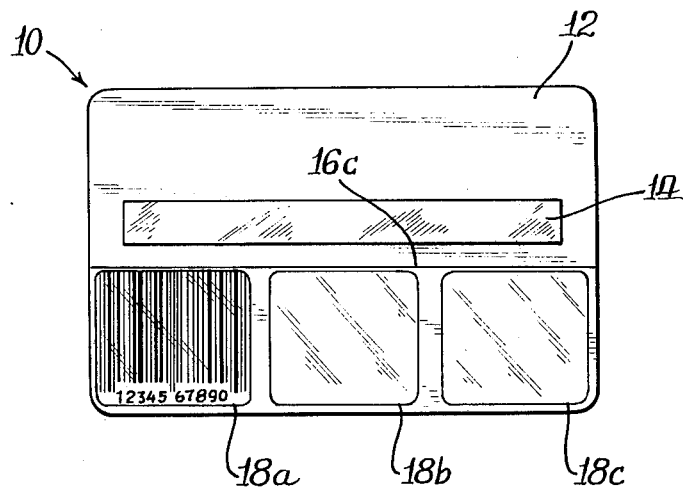
FIG. 2 is a plan view of the backside of a credit card also embodying the present invention; and, FIG. 3 is an enlarged cross sectional view taken generally along the line 3—3 in FIG. 1.

In accordance with the present invention, however, one or more members 16a, 16b may be provided on the front side of the card as shown in FIG. 1, or member 16c as shown on the backside of the card in FIG. 2 may be provided for the purpose of providing information that identifies the customer file and the financial affiliation in a format that is compatible with the Universal Product Code technique so that it may be used in grocery checkout stations using the same scanning apparatus that is used to identify packages or products that are purchased by a customer. Each of the members 16a and 16b are shown to have a single Universal Product Code symbol 18 thereon, while member 16c is shown to have a total of three symbols 18a, 18b and 18c printed in line on the unitary member. It should also be understood that members having single symbols or multiple symbols may be used without departing from the teachings of the present invention.

Each of the symbols 18 provide information in a rectilinear bar code format that is omnidirectional in that it can be scanned from any direction and provide the same information. Each of the symbols preferably contains 12 characters, broken into two symbol blocks of six characters each which can be independently scanned. Each of the symbol blocks is delineated by two dark guard bars, separated by light bars of one module each. Each character is represented by two dark and two light bars of an integral number of modules each, with each character also spanning a total of seven modules, the character beginning on a dark bar. These and other characteristics of the Universal Product Code Symbol are contained in an article entitled The Characteristics and Decodability of the Universal Product Code Symbol by D. Savir and G. J. Laurer contained in the IBM System Journal, Vol. 14, No. 1, 1975, printed by IBM Corporation, which is incorporated by reference herein.

Figure 3:
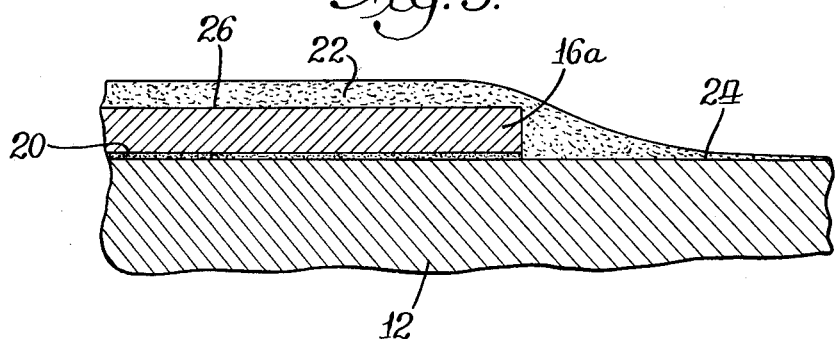

As previously mentioned, the card stock or card blank 12 for each credit card is mass produced in great quantity for economical and other reasons so that the opportunity for incorporating a UPC symbol having information that is unique to the proposed card holder is usually not present. Accordingly, it is necessary to incorporate the UPC symbol at a subsequent time when the card is issued to a card holder. The members 16 upon which the symbol is printed or otherwise applied preferably comprises a thin sheet of durable paper or the like, having a thickness of only a few mils, and preferably on the order of 1 to 2 mils (0.001 to 0.002 inches) which is applied to the blank 12 with an adhesive layer 20 as shown in FIG. 3.

To insure that the members 16 will not have their outer edges available to be caught and peeled back during normal usage which may easily detract from the effective usable life as well as the pleasing asthetic appearance and feel of the card, the applied member 16 is preferably coated with a relatively thin layer 22 of transparent acrylic, polyvinyl chloride or other suitable material so that the transition from the top surface 24 of the card 12 and the top surface 26 of the member 16 will be a smooth transition thereby eliminating any sharp edges around the outer periphery of the member 16. In this regard, the coating material should be transparent so that the symbols 18 can be read, and should adhere to both the member 16 and the card blank 12 and retain a flexibility that is compatible with the flexibility of the card blank itself so that the coating will not chip or crumble during normal usage and wear.

Since each of the symbols 18 contain 12 characters, at least two symbols (as shown on the front side of the card in FIG. 1) are required to provide the necessary information for identifying the routing member, the transit number, the branch number and the customer account number, the first three of which identify the banking institution including its location and routing information. A total of 19 characters are required to provide the above information, and since each symbol contains only 12 characters, at least two symbols 18 are required. In the event that such data as the expiration date of the card and other information is supplied, then additional symbols may be required, such as the three symbols on the backside of the card shown in FIG. 2.

As previously mentioned, the symbols are omnidirectionally readable so that the orientation of the symbol does not affect the reading by the scanning apparatus. It is to be appreciated that all products in supermarkets have but one symbol, since the twelve characters are adequate to supply the necessary information. Since the information required for the access card embodying the present invention requires more characters than can be supplied by one symbol, it is necessary that two or more symbols be used. The use of more than one symbol thereby necessitates character information that will identify the proper sequence of the symbols, i.e. which of the two or more is the "first" symbol, for example.

Thus, the leading character is preferably used to provide an identification that the symbol is for an identification and access card, as opposed to a grocery item, drug item for example and the trailing character can be used to identify the sequence of the particular symbol, i.e., whether it is the first or second symbol, for example, or the third if three symbols are used. The leading and trailing characters are located on opposite ends of each of the symbols as would be expected. Although these characters are preferred, it should be appreciated that other characters could be used for providing this information.

From the foregoing detailed description it should be understood that the credit card employing the member 16 with two or more Universal Product Code symbols thereon have significant advantages in the grocery and banking industries in that banking transactions can be combined with checkout procedures at the checkout counter of a grocery store in that the identity of the customer in terms of his account number, the bank in which the account is located and other transit in routing information that are used by the banking industry are available to be scanned by the same scanning apparatus that is used to span UPC symbols for the packages or products themselves. The manner in which the symbols are applied to the credit cards maintains the flexibility thereof and also provides protection to the symbol after it has been applied by virtue of the thin layer of transparent material that protects the edges as well as the top surface from damage during normal usage. The flexibility of the system permits the member 16 to be applied immediately prior to issuance of the card so that the information that is unique to the card can be encoded in the UPC symbol format and thereafter applied to the card. The use of the UPC symbol provides yet another means of incorporating data and important information on the card, in addition to the magnetic stripe and coded information, the raised embossed indicia in terms of the name and account number and the like.

It is of course understood that although preferred embodiments of the present invention have been illustrated and described, various modifications thereof will become apparent to those skilled in the art, and, accordingly, the scope of the present invention should be defined only by the appended claims and equivalents thereof.

Various features of the invention are set forth in the following claims.

What is claimed is:

1. An identification and access card for use with an automatic optical scanning apparatus receiving products omnidirectionally bearing product identification codes thereon, comprising, in combination:
   a plastic card blank having indicia thereon identifying a banking institution, said card blank being adapted to be embossed to provide raised indicia identifying the card holder to whom the card is issued;
   at least two lables on said card spaced from each other to provide separate information labels, each of said labels being secured to said card blank and having a generally quadrilateral area substantially less than that of said card blank, each of said labels having a plurality of elongated dark bars separated by light bars therebetween, the thickness and spacing of said bars providing binary coded information identifying a routing number, transit number, branch number of said banking institution and an account number of the card holder;

at least one of said bars on each of said labels scannable for identifying the label as bearing identification and access numbers rather than product numbers;

said labels being located on said card blank so that different ones of said labels may be read first causing said labels to be read out of sequential order for these labels, at least one of said bars on each of said labels scannable for identifying its sequential order relative to another label on said card for combining therewith to define the proper sequence for said numbers;

a thin coating of transparent material overlying said labels and providing a smooth transition between the surface of the blank and the surface over said labels.

2. An identification and access card as defined in claim 1 wherein said plastic card blank is fabricated from polyvinyl chloride.

3. An identification and access card as defined in claim 1 wherein said transparent material is bonded to said labels and to said blank and has a flexibility that is compatible with the flexiblity of said blank.

4. An identification and access card as defined in claim 3 wherein said transparent material comprises an acrylic material.

5. An identification and access card as defined in claim 1 wherein said thin coating of transparent material comprises polyvinyl chloride.

6. An identification and access card as defined in claim 1 wherein said symbol is an omnidirectionally readable rectilinear bar binary code, containing at least 10 characters, each character of which is identified by two of said darker bars separated by two of said light bars wherein the binary coded information is a function of the thickness and spacing of said bars.

7. An identification and access card as defined in claim 1 wherein said labels comprise paper having a thickness within the range of about 1 to about 3 mils.

8. An identification and access card as defined in claim 1 wherein said labels are adhesively applied to said card blank.

9. An identification and access card as defined in claim 1 wherein an additional label is applied to the backside of said card blank.

10. An identification and access card for use with an automatic optical scanning apparatus receiving products on omnidirectionally bearing product identification codes thereon comprising, in combination:

a plastic card blank having printed indicia thereon identifying a banking establishment, said card blank being adapted to be embossed to provide raised indicia identifying the card holder to whom the card is issued;

a thin elongated stripe of material located on at least one face thereof adapted to be magnetically encoded with information identifying a routing number, transit number, branch number of the banking institution and an account number of the card holder; said card blank having a generally planar surface, one or more members carrying a total of at least two symbols thereon, said member being attached to said planar surface of said card blank and projecting outwardly thereof, each of said symbols having a plurality of elongated dark bars separated by light bars therebetween, the thickness and spacing of said bars providing binary coded information identifying the routing number, transit number, branch number of said banking institution and the account number of the card holder, the information contained on said symbols being substantially similar to the information contained on said stripe;

at least one of said bars on each of said members scannable for identifying the member as bearing identification and access numbers rather than product numbers; said member being located on said card blank so that different ones of said members may be read first depending on the direction of scanning movement and causing said members to be read out of sequential order in at least one direction of scanning movement, at least one of said bars on each of said members scannable for identifying its sequential order relative to another member on said card for combining therewith to define the proper sequence for said members, a thin layer of transparent, flexible material overlying said outwardly projecting members and the adjacent portion of said planar layer of said card blanks, said layer bonding to both said card blank and said member and being of sufficient thickness to provide a smooth transition between the planar surface of said blank and said upstanding members to substantially reduce the probability that said member will be partially separated from said card blank during normal use.

11. An identification and access card as defined in claim 10 wherein said plurality of light and darker bars define at least 10 characters, each character of which is identified by two of said darker bars separated by two of said light bars and the binary coded information is determined by the thickness and spacing of said bars.

12. An identification and access card as defined in claim 11 wherein said symbols are omnidirectionally readable and contain character information identifying the sequence of symbols so that said identifying information from each symbol can be accurately combined.

13. An identification and access card as defined as claim 12 wherein said sequencing information and information identifying said symbols as being associated with an identification and access card are provided in two characters.

14. An idenfication and access card as defined in claim 13 wherein said two characters are located at opposite ends of each of said symbols.

* * * * *